Patented Nov. 9, 1926.

1,606,281

UNITED STATES PATENT OFFICE.

RICHARD C. WILLIAMS, OF BALTIMORE, MARYLAND, ASSIGNOR TO THE DIATOM INSULATION COMPANY, OF BALTIMORE, MARYLAND, A CORPORATION OF DELAWARE.

METHOD OF PREPARATION OF DIATOMACEOUS EARTH.

No Drawing.   Application filed July 15, 1925. Serial No. 43,872.

This invention relates to the preparation of diatomaceous earth for use in filters and the like.

Diatomaceous earth consists principally of the skeletal frames of diatoms mixed with more or less impurities of various kinds as will now be described.

Diatoms are microscopic algæ, a lower order of plant, which secrete ordinarily a silicious skeleton. They live in fresh, brackish or salt water. When the organism dies, the organic matter decays and the skeletons sink to the bottom. As these skeletons are very minute, millions and millions of them are found in a cubic inch. It therefore follows that, for the accumulation of any considerable body of this material, a long period of time is necessary and bodies of water such as lakes, lagoons, etc., must have existed into which streams flowing were so extremely sluggish that a minimum of water borne material was carried particularly sand and clay. Naturally the less the water borne material the purer the deposit.

There are in addition to the material carried in mechanically by the streams, chiefly sand and clay, other impurities, added chemically either coincident with the deposition of the diatoms or after the deposit was formed by subsequent chemical reactions.

By the foregoing is meant, during the weathering of the rocks of the watershed, a certain portion is rendered soluble by well known chemical reactions, carried by the streams into the body of water in which the deposit is forming and there by other chemical reactions is rendered insoluble and precipitated at the same time as the diatoms are being deposited. This naturally will be a comparatively small amount as weathering at this time in watershed of the streams will be at a minimum. However it is to be particularly noted that an extremely small percent of these impurities exercise a very deleterious effect on the diatomaceous earth, rendering it valueless for the most important commercial uses. In addition to the foregoing chemical means, usually much more important, there is another chemical means for after the deposition of the diatoms, other deposits are laid down on top of it, usually sand and clay. When these beds are lifted above sea level, weathering again sets in and certain elements particularly iron, lime and silica by chemical means are dissolved, carried down by the waters into the diatomaceous earth and there redeposited because of different physical and chemical conditions. Naturally most of this deposition will take place where the descending waters can travel freest, i. e.. in cracks and more porous places of the diatomaceous earth. This is fortunate for the iron which is particularly harmful is therefore precipitated in comparatively large pieces.

The chief commercial uses of diatomaceous earth are for heat insulation and filtration. It is well known that the lighter the earth the better it is for insulation. In other words the less the diatoms are broken (which naturally makes the product more dense) the better the product. This is equally true for filtration purpose for whole diatoms form a much more porous cake in the presses thereby increasing the speed of filtration.

From the foregoing it is apparent that the problem confronting one who is purifying this material is first to remove sand, lime, and clay as completely as possible; second, to do the first in such a way that the diatoms are broken as little as possible and to remove the initially fractured diatoms as well as those broken in the treatment from the whole ones; and third to do this economically.

Heretofore the method usually employed has been to dry the material, grind very fine and blow the pulverized earth through a long tunnel. Naturally the heavy material separates out from the air current first with the very lightest i. e. the finest going out to the end. This method is uneconomical, does not allow the careful separation of the whole from the fractured diatoms and results in an impure product for the following reasons.

First. The material, as it is taken out of the bank by the usual methods consists of lumps of irregular size and fines which in a humid climate particularly must be artificially dried. Naturally the large lumps will require more time to dry than the smaller ones but all the material must be thoroughly dried for efficient grinding. Therefore all must remain in the drier until the larger lumps are dried, the smaller ones unnecessarily, thereby cutting down the capacity of the drier. The fines offer great difficulties in drying for heat penetrates very slowly and by the ordinary means of mechanically stirring, owing to its extreme lightness and fineness, it flies in the air and a large percentage is lost. Second. When the diatomaceous earth is thoroughly dried, particularly in a drier, it becomes hard, as the clay tends to stick the diatoms together. This requires extra grinding which fractures a large number of diatoms. Third. The iron, a very large percentage of which, as before noted, is in comparatively large pieces, on being thoroughly dried readily crumbles into dust and, in the wind tunnel, a large percentage of the contained iron is added to the refined diatoms, greatly decreasing their value. The same may be said of the clay in even greater measure though its effect is not so harmful.

Fourth. Air separation is by no means as efficient as water separation, owing to the countercurrents set up in the tunnel, and the separation of the large unbroken diatoms on the one side from the fine sand and on the other side from the broken diatoms and clay is not well done. As witness to this fact it may be noted that in mills, treating ores of all kinds, even in regions where water is scarce and expensive, in no case that I know of is air separation resorted to but always some form of water separation.

The advantages of water separation over air are manifold, viz. First, the lumps, as they come from the deposit, readily slack with stirring and grinding is unnecessary. By agitation and the addition of deflocculating material such as sodium carbonate, sodium silicate, etc., each individual diatom is separated, not only from the sand and clay, but also from the neighboring diatoms, with a minimum of fracturing. In this condition by utilizing the great difference in specific gravity between the diatoms and the sand by a number of devices, a sharp separation can be made. There is thus left as a product whole diatoms, fractured diatoms, and clay. As before noted diatoms are very minute, therefore, when fractured, they enter into the colloidal or semi-colloidal state. The clay is very largely colloidal, hence in a deflocculated state, the fractured diatoms and clay stay in suspension a very long time. By suitable mechanical devices, using this principle, a separation can be made. Second. It is much more economical for by removing sand, iron and clay, etc., there is left only the refined product to be dried and ground, which is in most cases about 50% of the original material. Moreover by the use of filter presses, a porous cake containing no more water than the original material can be secured, of the right thickness for efficient drying and containing no fines.

Third. As the iron is in the form of limonite or other hydrated forms of iron which are soluble in hydrochloric acid, a small percentage of this acid can be added to the product which will not only dissolve and remove the minute percentages of iron and limestone remaining in the product, but will also flocculate the diatoms and cause their rapid precipitation thereby making a better cake on the filter presses and greatly whitening the final product.

Under these conditions the principal object of the present invention is the provision of a novel and improved process by means of which the unbroken skeletal frames found in such diatomaceous earth may be effectually separated from the broken frames and impurities existing in such earth.

With the above and other objects in view, as will be hereinafter apparent, the invention consists in general of a novel process hereinafter fully described and specifically claimed.

The overburden is taken off the deposit by steam shovel, scraper line or other suitable device and the diatomaceous earth, after it has been scooped up, is conveyed to the plant by suitable means. There it is dumped into a tank where water preferably under pressure, through nozzles so arranged as to thoroughly agitate the mass, though other methods of mixing may be used, is added. In this manner the material will be thoroughly slaked and the individual diatoms will be freed from each other and the sand, clay, and the most of the iron. A small percentage of deflocculating substance, such as lime, hydrochloric acid or the like, is now added, by which each diatom is given an electrical charge of the same nature. This applies likewise to the clay and broken diatoms. As they all have a like electrical charge, they repel each other in suspension and are kept separate. This is most important as the diatoms are jagged and rough which makes them very prone to unite in comparatively large masses. These masses of diatoms and the very fine sand found in this earth as an impurity are so nearly alike in specific gravity that the separation is very difficult, if not impossible, by the means ordinarily employed. To this fact I ascribe the lack of success attending the efforts to purify in the past. However, by deflocculating and taking advantage of the minute size of the diatoms and their low specific gravity (due to their porous nature), a very satisfactory separation can be made in any one of a number of classifiers (for example the Dorr).

This is the next step. The sand and large pieces of iron are taken out and whole diatoms, fractured diatoms and clay in a colloidal condition left in suspension. The clay and fractured diatoms will stay in suspension for days in a deflocculated condition whereas whole diatoms will slowly settle out. Therefore by settling or the use of mechanical devices designed to separate very fine material, a very satisfactory separation of the whole diatoms and the clay can be made. For certain purposes this is unnecessary, particularly when the original content of clay is small. In this event, a rapid settlement can be made by the use of a flocculating material such as lime, hydrochloric acid or the like which is added and a rapid settlement effected. This has the further advantage of making a better cake on the filter press and, in the case of hydrochloric acid being used, of dissolving the small amount of iron and lime remaining to the solution.

The material is now run into a filter press to remove the excess water and to form the product into a cake suitable for drying in a dryer. As drying is the most expensive and difficult part in the whole process in a humid climate, it will be well to recapitulate the advantages over the old methods this process has.

There are no fines and the cakes are all approximately the same size, hence the maximum amount can be put in a drier under the very best conditions for drying with no more water than was contained in the material originally.

The cake is more porous than the original material as it has not been subjected to pressure as were the original beds of material for they are found usually under a heavy overburden.

Sand and particles of iron are eliminated in the first stage thereby decreasing the amount of material to be dried by just that amount.

By this method there is provided a highly superior product consisting substantially in its entirety of substantially whole skeletal frames of diatoms free from impurities of injurious character and quantity.

Having thus described the invention, what is claimed as new, is:

1. The method of separating the whole skeletal frames of diatoms from diatomaceous earth which consists in mixing raw diatomaceous earth with a relatively large quantity of water, adding thereto a deflocculating substance, permitting the mixture to deflocculate, adding a flocculating substance, permitting the heavier whole frames to settle to the bottom of the mixture, and removing the unsettled broken frames and impurities with the supernatant water.

2. The method of separating the whole skeletal frames of diatoms from diatomaceous earth which consists in mixing raw diatomaceous earth containing impurities with a relatively large quantity of water, adding thereto a deflocculating substance, permitting the mixture to deflocculate, adding a flocculating substance capable of dissolving the said impurities contained in the raw earth, permitting the heavier whole frames to settle to the bottom of the mixture, and removing the unsettled broken frames and impurities with the supernatant water.

In testimony whereof I affix my signature.

RICHARD C. WILLIAMS.